United States Patent
Ye et al.

(10) Patent No.: US 12,014,037 B2
(45) Date of Patent: Jun. 18, 2024

(54) GRAPHICAL USER INTERFACE (GUI) OF A CONSOLIDATED USER INCIDENT REPORT

(71) Applicant: SAP SE, Walldorf (DE)

(72) Inventors: Bizhong Ye, Beijing (CN); Peihua Li, Beijing (CN); Yuchi Zhang, Beijing (CN); Wen Wang, Beijing (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/549,195

(22) Filed: Dec. 13, 2021

(65) Prior Publication Data
US 2023/0185439 A1 Jun. 15, 2023

(51) Int. Cl.
G06F 3/04845 (2022.01)
G06T 11/60 (2006.01)
G06V 10/44 (2022.01)
G06V 20/62 (2022.01)

(52) U.S. Cl.
CPC .......... *G06F 3/04845* (2013.01); *G06T 11/60* (2013.01); *G06V 10/44* (2022.01); *G06V 20/62* (2022.01)

(58) Field of Classification Search
CPC ............. G06F 3/04845; G06F 11/0751; G06F 2201/835; G06F 9/453; G06F 11/0769; G06F 11/0793; G06T 11/60; G06V 10/44; G06V 20/62; G06V 30/41
See application file for complete search history.

(56) References Cited

U.S. PATENT DOCUMENTS

| | | | |
|---|---|---|---|
| 8,844,059 B1 * | 9/2014 | Manmohan | G06F 21/6218 726/28 |
| 8,959,063 B2 | 2/2015 | Haeberle et al. | |
| 10,242,117 B2 | 3/2019 | Wilson et al. | |
| 10,515,323 B2 | 12/2019 | Ronen et al. | |
| 10,826,942 B2 | 11/2020 | Brotherton et al. | |
| 10,862,905 B2 | 12/2020 | Zettel et al. | |
| 11,373,035 B1 * | 6/2022 | Nomura | G06F 3/0481 |

(Continued)

OTHER PUBLICATIONS

"New features and products in Paris | ServiceNow Docs," printed Aug. 6, 2021 from https://docs.servicenow.com/bundle/paris-release-notes/page/release-notes/summary/rn-summary-new-features.html, 93 pages, last updated Apr. 10, 2018.

(Continued)

*Primary Examiner* — Rami R Okasha
(74) *Attorney, Agent, or Firm* — Sterne, Kessler, Goldstein & Fox P.L.L.C.

(57) ABSTRACT

Disclosed herein are system, method, and computer program product embodiments for generating a graphical user interface (GUI) with a consolidated user incident report. In some embodiments, a server receives a set of data comprising a first set of data elements. The server incorporates the set of data on a graphical user interface (GUI). The set of data is rendered in a first portion of the GUI and the different set of data is rendered in a second portion of the GUI. The server further receives a request to delete one or more data elements of the set of data or the different set of data from the GUI. As such, the server consolidates the first and second portion into a combined portion on the GUI. The combined portion comprises the set of data and the different set of data excluding the one or more data elements.

20 Claims, 6 Drawing Sheets

(56) References Cited

U.S. PATENT DOCUMENTS

| | | | | |
|---|---|---|---|---|
| 11,397,994 B1* | 7/2022 | Urrutia | ............. | G06Q 20/10 |
| 2014/0081925 A1* | 3/2014 | Haeberle | ............. | G06F 16/174 |
| | | | | 707/E17.009 |
| 2015/0058716 A1* | 2/2015 | Boothman | ............. | G06F 40/143 |
| | | | | 715/254 |
| 2015/0379520 A1* | 12/2015 | Allen | ............. | G06Q 30/016 |
| | | | | 705/304 |
| 2016/0147386 A1* | 5/2016 | Han | ............. | H04N 1/00411 |
| | | | | 715/838 |
| 2016/0173435 A1* | 6/2016 | Abou Mahmoud | .... | H04L 51/52 |
| | | | | 709/206 |
| 2017/0147544 A1* | 5/2017 | Modani | ............. | G06F 16/345 |
| 2017/0192952 A1* | 7/2017 | Lehmann | ............. | G06F 11/3438 |
| 2018/0150478 A1* | 5/2018 | Wang | ............. | G06F 16/185 |
| 2018/0366021 A1* | 12/2018 | Zertuche | ............. | G09B 7/00 |
| 2019/0266064 A1* | 8/2019 | Srinivasan | ............. | H04L 41/5074 |
| 2020/0272691 A1* | 8/2020 | Mandal | ............. | G06F 40/295 |
| 2020/0328961 A1 | 10/2020 | Puri et al. | | |
| 2020/0401935 A1* | 12/2020 | Malhotra | ............. | G06N 20/00 |
| 2021/0192126 A1* | 6/2021 | Gehrmann | ............. | G06N 20/00 |
| 2021/0342532 A1* | 11/2021 | Yeddu | ............. | G06F 18/22 |

OTHER PUBLICATIONS

"SOCaaP—Manage Incidents," Version 3.3.010820, printed Aug. 6, 2021 from https://help.comodo.com/topic-466-1-1040-16282-.html, 7 pages.

* cited by examiner

GRAPHICAL USER INTERFACE (GUI) OF A CONSOLIDATED USER INCIDENT REPORT

BACKGROUND

Entities often provide an interface for displaying user incident reports. The user incident reports include attachments (e.g., images, documents, files, etc.) and comments regarding a user's comment or complaint about some issue (e.g., technical issue) the user encountered while using a given system. Multiple individuals may handle the user incident report over a period of time in an attempt to resolve the issue. A conventional interface may render the user incident report; however, the conventional interface may include attachments and comments related to duplicative or erroneous issues. Furthermore, the conventional interface may not effectively map the attachments and comments to one another. As a result, the last individual to attempt to resolve the issue for the user may be unable to find the most current and accurate data. This may result in the last individual inefficiently or inaccurately addressing the user's issue.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a generating a graphical user interface (GUI) with a consolidated user incident report.

As described above, conventional interfaces for rendering user interface reports may ineffectively provide attachments and comments regarding a particular user issue (e.g., incident). The conventional interface may include duplicative and erroneous attachments or comments. Furthermore, the attachments and comments related to the user issue may not be mapped accurately on the conventional interface. As a result, individuals assigned to resolve the user issue may fail to accurately grasp the issue when analyzing the attachments and comments on the conventional interface.

Embodiments described herein solve these problems by providing a consolidated view of user incident reports. In some embodiments, a server receives a set of data comprising a first set of data elements. The server incorporates the set of data on a graphical user interface (GUI). The set of data is rendered in a first portion of the GUI, and the different set of data is rendered in a second portion of the GUI. The first portion and the second portion are rendered chronologically on the GUI based on a first timestamp of when the first set of data was received and a second timestamp of when the second set of data was received. The server further receives a request to delete one or more data elements of the first set of data elements or the second set of data elements from the GUI. As such, the server consolidates the first and second portions into a combined portion on the GUI. The combined portion comprises the first set of data and the second set of data, excluding the one or more data elements.

The embodiments described herein provide a consolidated view of a user incident report that includes current and accurate attachments and comments. This allows individuals assigned to resolve a user issue to view and analyze the user issue in an efficient and organized manner. As a result, the individual attempting to resolve the user issue may do so quickly and accurately.

Figure 1:
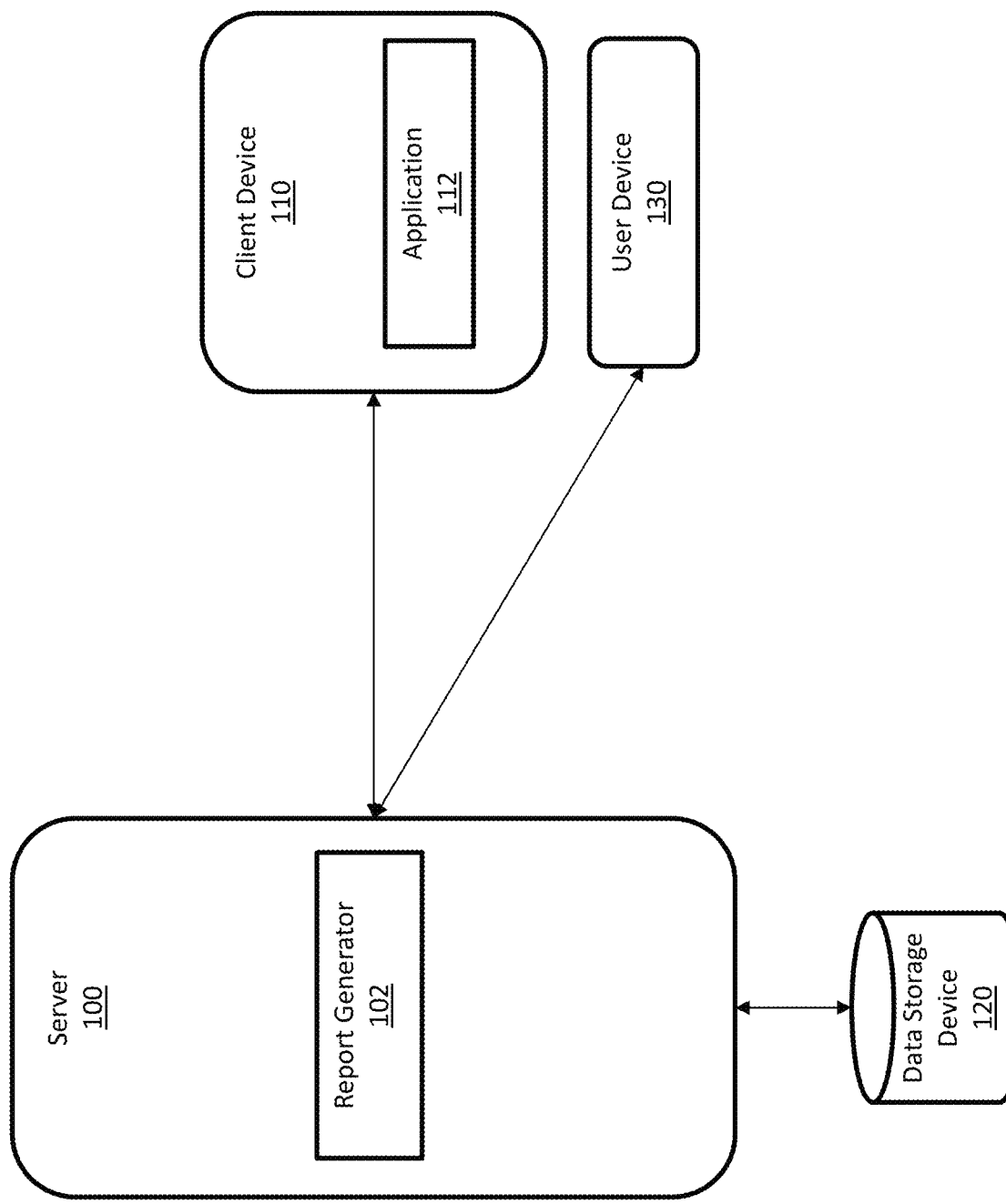
FIG. 1 is a block diagram of an architecture of a system for tracking application usage data, according to some embodiments.

FIG. 1 is a block diagram of an architecture of a system for providing a consolidated view of a user incident report, according to some embodiments. In an embodiment, the architecture may include a server 100, client device 110, data storage device 120, user device 130. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Server 100 may include report generator 102. Report generator 102 may generate a graphical user interface (GUI) for a user incident report. A user incident report may include comments and attachments associated with a reported incident. For example, an incident may be a technical issue the user encountered while interacting with an application, website, web application, etc. The technical issues may include corrupt data, errors, broken links, exceptions, etc.

Data storage device 120 may be one or more databases configured to store structured and unstructured data. Data storage device 120 may be configured to store user incident reports. The user incident reports may be stored as files in data storage device 120. The file types may include pdf, doc, txt, RTF, etc.

Client device 110 may include application 112. Application 112 may be used to access user incident reports from report generator 102. A user incident report may be rendered on the user interface of application 112. Application 112 may be an Internet browser. As such, application 112 may navigate to a webpage, including the user incident report. Alternatively, application 112 may be a web-based application.

User device 130 may be used by a user. User device 130 may execute one or more applications. The user may use user device 130 to report incidents to application 112 or server 100.

Figure 2A:
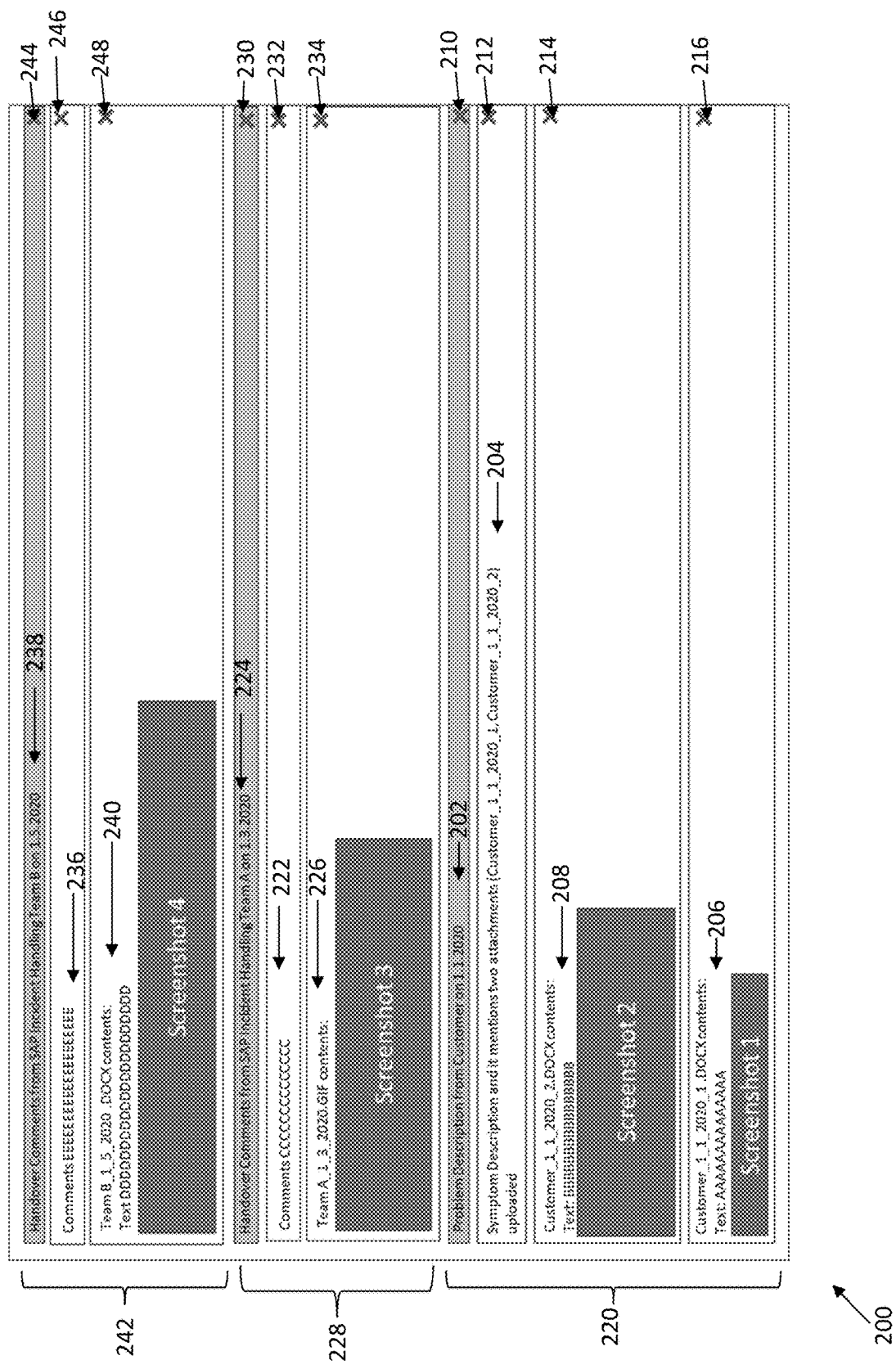
FIGS. 2A-2C are example graphical user interfaces (GUI) rendering a user incident report, according to some embodiments.
Figure 2B:
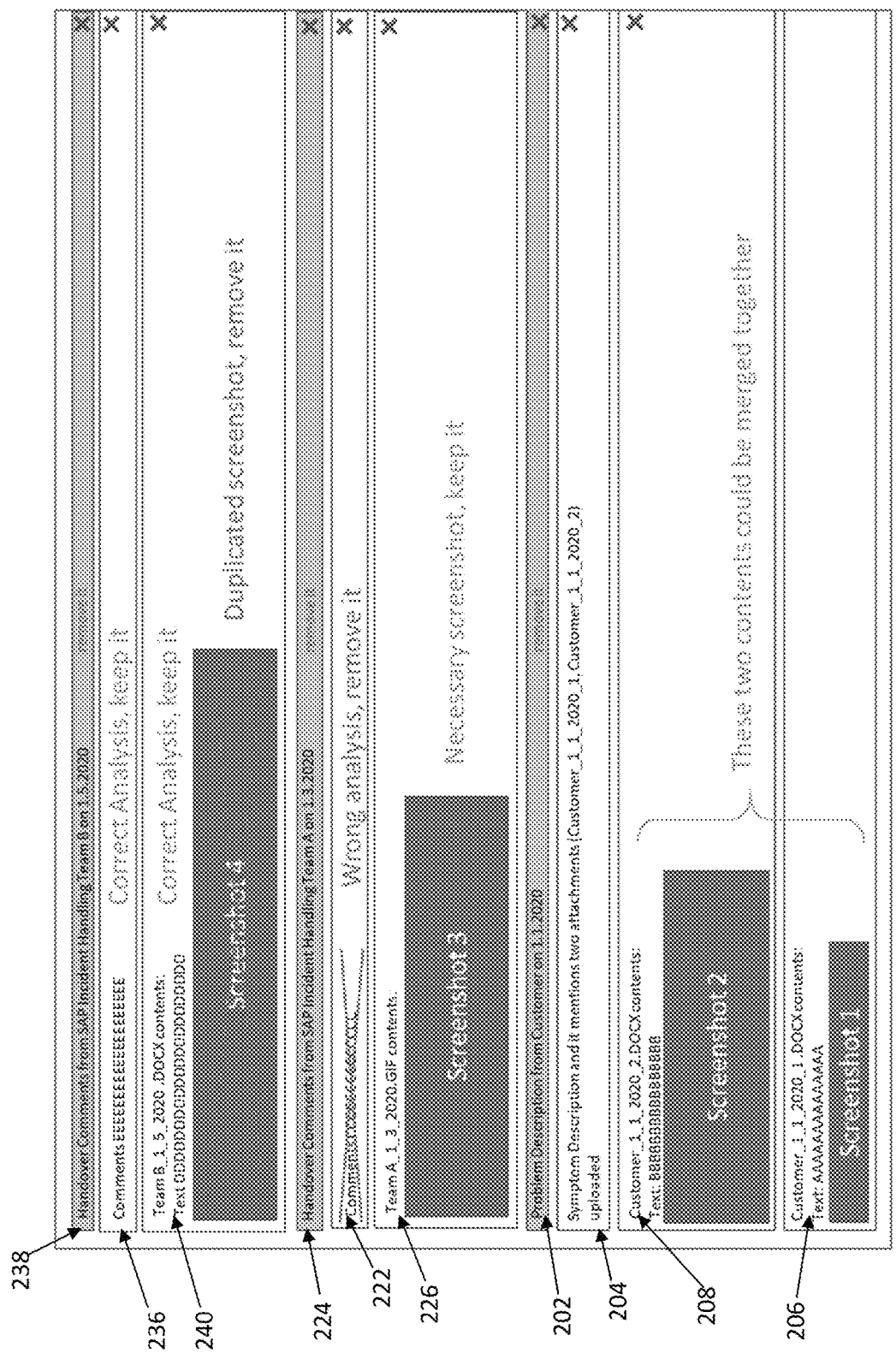
Figure 2C:
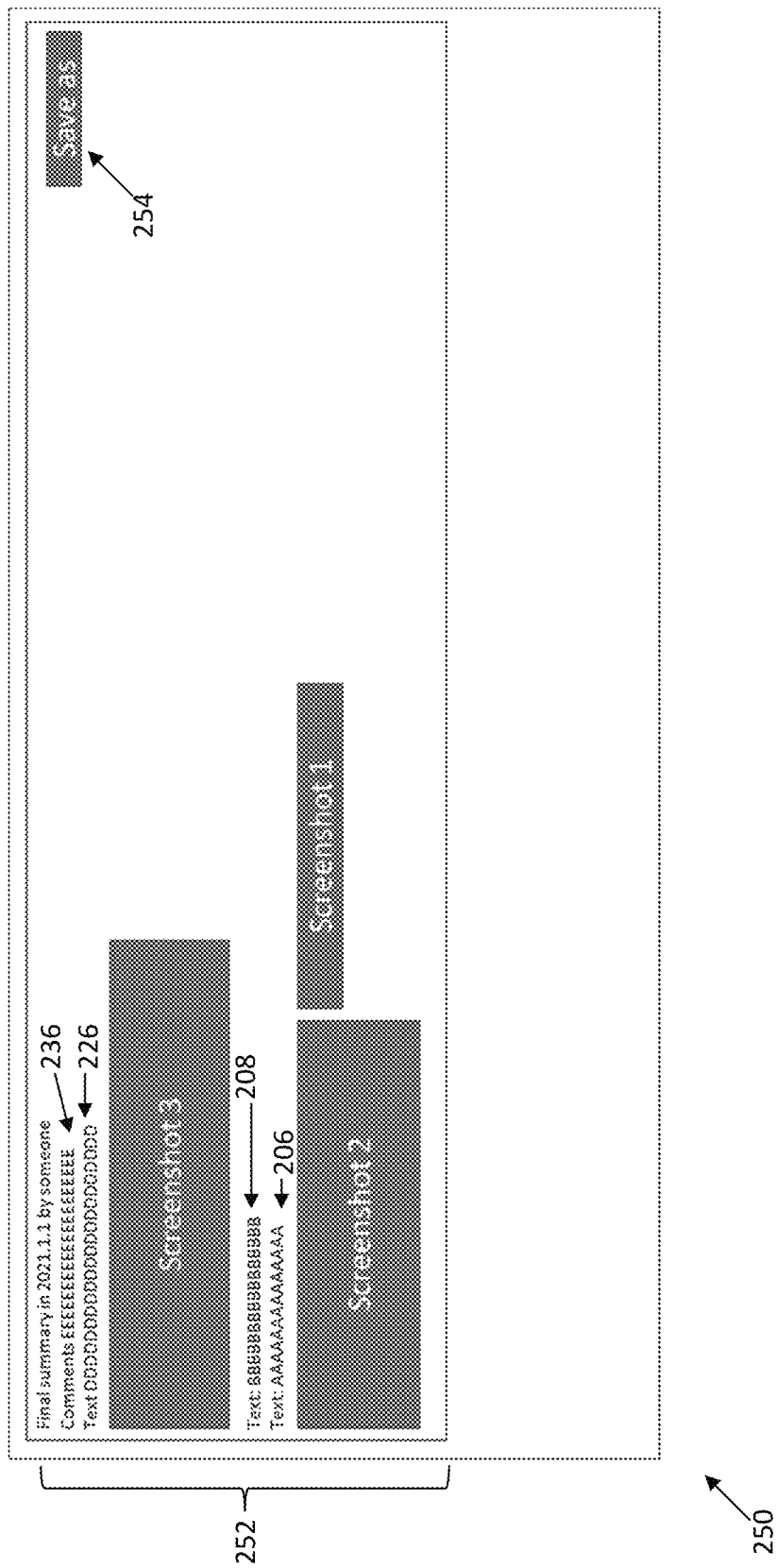

FIGS. 2A-2C are example graphical user interfaces (GUI) rendering a user incident report, according to some embodiments. FIGS. 2A-2C shall be described with reference to FIG. 1.

As indicated above, user incident reports may be created when a user reports an incident, including an issue (e.g., technical issue) associated with an application. A user may provide data associated with the incident, including a description of the incident and attachments. The attachments may be files such as images, documents, screenshots, etc. The attachments may depict or illustrate the issue.

When the incident is reported, support team members may attempt to resolve the issue. This may involve troubleshooting the application, such as editing the application's settings, editing the application's code, etc. Different departments of support team members may need to assist in resolving the issue. As such, it may be necessary for the support team member to identify the details of the issue and the latest event that occurred to resolve the issue. This may be captured in the user incident report.

With respect to FIG. 2, GUI 200 is illustrated. GUI 200 includes details about a user incident report. As a non-limiting example, a user may interact with an application. The user may encounter an issue. The user may contact a support team member associated with the application to report the incident of the issue.

A first support team member may use application 112 on client device 110 to collect the data associated with the incident. The data may include comments and attachments. The comments may be details about the incident and steps that were taken to resolve the issue. The attachments may include files associated with the incident. The files may include documents, screenshots, images, etc.

Application 112 may transmit the comments and attachments to server 100. The comments may include comments 204, and the attachments may include screenshot 1 and screenshot 2. In some embodiments, the user may transmit comments 204 and screenshots 1 and 2 to server 100 using user device 130. Screenshots 1 and 2 may be screenshots of the application and may depict or illustrate the issue. For example, if the issue is that an error or exception. Screenshots 1 and 2 may be screenshots of the application displaying the error or exception.

Server 100 may receive comments 204 and screenshots 1 and 2. Server 100 may also receive information about the user reporting the incident and timestamp of when the user reported the incident from application 112 or user device 130. Server 100 may extract text from screenshots 1 and 2 to generate extracted text 206 and 208. Report generator 102 may use techniques such as optical character recognition (OCR) to extract the text from screenshots 1 and 2.

Report generator 102 may generate GUI 200. GUI 200 may be associated with the user incident. GUI 200 may include comments 204 and screenshots 1 and 2. GUI 200 may also include details 202. Details 202 may include information about the incident, as described by the user, user information (e.g., user name, identification number, user ID, etc.), and a timestamp of when the incident was reported. GUI 200 may also include extracted text 206 and extracted text 208. Extracted text 206 may be text extracted from screenshot 1, and extracted text 208 may be text extracted from screenshot 2.

Report generator 102 may group details 202, comments 204, screenshot 2, extracted text 208, screenshot 1, and extracted text 206 in portion 220 of GUI 200. Details 202 may be the header of portion 220. Comments 204 may be included in a first section of portion 220. Extracted text 208 and screenshot 2 may be included in a second section of portion 220. Extracted text 206 and screenshot 1 may be included in a third section of portion 220. Details 202, comments 204, extracted text 206, and extracted text 208 may be editable.

GUI 200 may include button 210 in the header of portion 220, button 212 in the first section of portion 220, button 214 in the second section of portion 220, and button 216 in the third section of portion 220. Buttons 210-216 may be selected to delete the respective header or section. In some embodiments, screenshot 1, screenshot 2, extracted text 206, and extracted text 208 may also be individually deleted.

Details 202, comments 204, screenshot 2, extracted text 208, screenshot 1, and extracted text 206 may make up the user incident report. The user incident report may be stored in data storage device 120.

Subsequently, a second support team member may attempt to resolve the incident. The second support team member may use application 112 to transmit a request to server 100 to retrieve the user incident report. Server 100 may retrieve the user incident report from data storage device 120 using an identifier associated with the user incident report. Report generator 102 may cause the display of the user incident report, including details 202, comments 204, screenshot 2, extracted text 208, screenshot 1, and extracted text 206, may be rendered on GUI 200 on application 112.

The second support team member may transmit comments 222 and screenshot 3 to server 100 using application 112. Comments 222 may include details about attempting to resolve the incident. Screenshot 3 may be associated with the attempt to resolve the incident. For example, screenshot 3 may be a screenshot of an interface of the application while the second support team member is attempting to resolve the issue. Screenshot 3 may depict the issue encountered by the user or the progress of the second support team member in resolving the issue.

Server 100 may receive comments 222 and screenshot 3. Server 100 may also receive details 224 from application 112. Details 224 may include identification information of the second support team member and a timestamp. The timestamp may indicate when comments 222 and screenshot 3 were received by server 100. Report generator 102 may extract the text from screenshot 3 to generate extracted text 226.

Report generator 102 may update GUI 200 to include details 224, comments 222, extracted text 226, and screenshot 3. Report generator 102 may group details 224, comments 222, extracted text 226, and screenshot 3 in portion 228 of GUI 200. Details 224, comments 222, and extracted text 226 may be editable.

Details 224 may be the header of portion 228. Report generator 102 may include comments 222 in a first section of portion 228 and extracted text 226 and screenshot 3 in a second section of portion 228.

GUI 200 may include button 230, button 232, and button 234. Button 230 may be selected to delete details 224, button 232 may be selected to delete the first section, and button 234 may be selected to delete the second section. In some embodiments, screenshot 3 and extracted text 226 may be individually deleted.

Report generator 102 may render portion 228 above portion 220 in chronological order based on the timestamp in details 202 and details 224. The user incident report on GUI 200 may be saved in data storage device 120.

Subsequently, a third support team member may attempt to resolve the issue in the incident. The third support team member may transmit a request to server 100 to retrieve user incident report from data storage device 120 using the identifier associated with the user incident report. Report generator 102 may cause display of GUI 200, including the user incident report on application 112.

GUI 200 may include portion 220 and portion 228. The third support team member may transmit comments 236 and screenshot 4 to server 100 using application 112. Comments 236 may include details about attempting to resolve the incident. Screenshot 4 may be associated with the attempt to resolve the incident. For example, screenshot 4 may a screenshot of an interface of the application while the third support team member is attempting to resolve the issue. Screenshot 4 may depict the issue encountered by the user or the progress of the third support team member in resolving the issue.

Server 100 may receive comments 236 and screenshot 4. Server 100 may also receive details 238. Details 238 may include identification information of the third support team member and a timestamp. The timestamp may indicate when comments 236 and screenshot 4 were received by server 100. Report generator 102 may extract the text from screenshot 4 to generate extracted text 240.

Report generator 102 may update GUI 200 to include details 238, comments 236, extracted text 240, and screenshot 4. Report generator 102 may group details 238, comments 236, extracted text 240, and screenshot 4 in portion 242 of GUI 200. details 238, comments 236, and extracted text 240 may be editable.

Details 238 may be the header of portion 242. Report generator 102 may include comments 236 in a first section of portion 242 and extracted text 240 and screenshot 4 in a second section of portion 242.

GUI 200 may include button 244, button 246, and button 248. Button 244 may be selected to delete details 238, button 246 may be selected to delete the first section, and button 248 may be selected to delete the second section. In some embodiments, screenshot 4 and extracted text 240 may be individually deleted.

Report generator 102 may render portion 242 above portions 228 and 220 on GUI 200 based on the timestamp in details 202, 224, and 238. This indicates that comments 236 and screenshot 4 were received after comments 222 and screenshot 3 and 204 and screenshots 1 and 2. In other words, GUI 200 may render events chronologically. GUI 200 may render the data associated with the third support team member attempting to resolve the issue on top of GUI 200. The initial reporting of the incident may be on the bottom of GUI 200. This way, the next support team member to access the user incident report may view the most current information on top.

With respect to FIG. 2B, a fourth support team member may look to consolidate the user incident report. The fourth support team member may use application 112 to transmit a request to server 100 to retrieve the user incident report. Server 100 may retrieve the user incident report from data storage device 120 using the identifier associated with the user incident report. Server 100 may cause the display of the user incident report on GUI 200 on application 112.

The fourth support team member may determine that screenshot 4 is duplicative and is not needed. As such, the fourth support team member may interact with application 112 to delete screenshot 4. Furthermore, the fourth team member may determine details 238 are not needed, and therefore, the fourth support team member may interact with application 112 to delete details 238. Similarly, the fourth team member may determine that details 224 and 202 are not needed, and therefore, the fourth support team member may interact with application 112 to delete details 224 and 202.

Additionally, the fourth support team member may determine that comments 222 provide an incorrect analysis, and therefore, the fourth support team member may interact with application 112 to delete comments 222. Moreover, the fourth support team member may determine that screenshots 1 and 2 and comments 206 and 208 may be merged. Each time something is deleted from GUI 200, GUI 200's size may automatically adjust.

With respect to FIG. 2C, summary 250 of the user incident report is illustrated. Summary 250 may be a consolidated user incident report. Report generator 102 may generate summary 250 as a result of the fourth support team member deleting and merging the data on GUI 200. The fourth support team member did not select to delete comments 236, extracted text 226, screenshot 3, extracted text 206, extracted text 208, screenshot 1, and screenshot 2. As such, comments 236, extracted text 226, screenshot 3, extracted text 206, extracted text 208, screenshot 1, and screenshot 2 may be consolidated into a combined portion 252. The fourth support team member did not select to delete comments 236, extracted text 226, screenshot 3, extracted text 206, extracted text 208, screenshot 1, and screenshot 2.

As indicated above, application 112 may receive an input from the fourth support team member to merge screenshots 1 and 2 and comments 206 and 208 may be merged. Application 112 may transmit a request to server 100 to arrange screenshots 1 and 2 and comments 206 and 208 in a predetermined arrangement based on the request. As such, report generator 102 may move screenshot 1 adjacent to screenshot 2. Furthermore, report generator 102 may position extracted text 208 above extracted text 206.

The fourth support team member may use application 112 to select button 254 to save summary 250. Summary 250 may be saved as a file (e.g., pdf, doc, txt, RTF, etc.) in data storage device 120.

Figure 3:
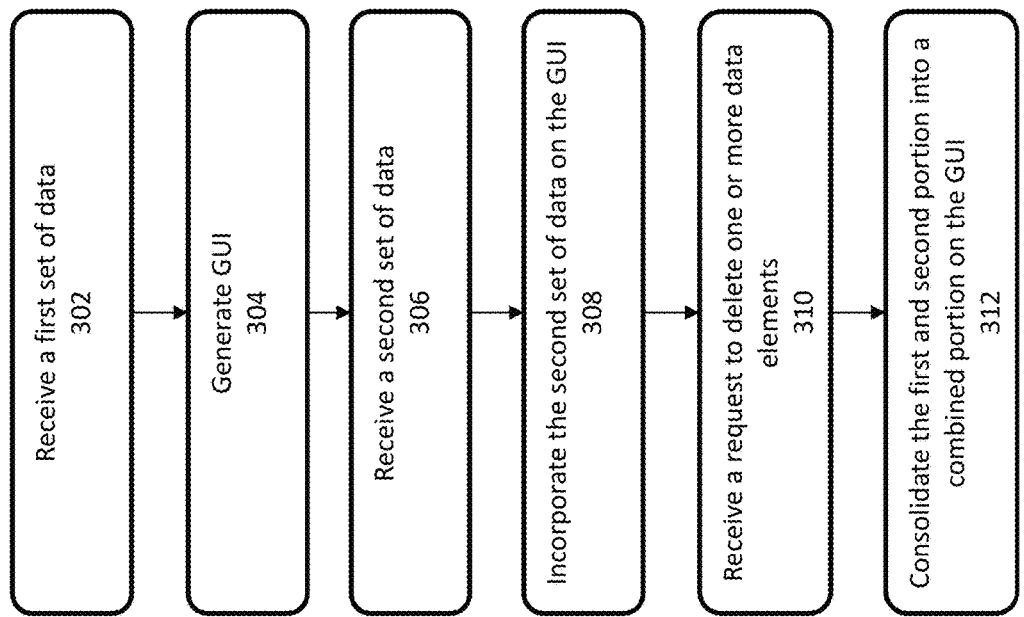
FIG. 3 is a flowchart illustrating a process for generating a GUI for a consolidated user incident report, according to some embodiments.

FIG. 3 is a flowchart illustrating a process for generating a consolidated user incident report, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 7, as will be understood by a person of ordinary skill in the art.

Method 300 shall be described with reference to FIG. 1. However, method 300 is not limited to that example embodiment.

In 302, server 100 receives a first set of data comprising a first set of data elements from application 112. The first set of data elements may include image and text data associated with an incident. The text data may include comments about the incident, and the image data may be an attachment associated with the incident. For example, the image data may depict or illustrate the issue in the incident.

In 304, report generator 102 generates a graphical user interface (GUI), including the first set of data elements. The text data of the first set of data elements may be editable. A user may delete both the text data and the image data from the GUI. Report generator 102 may group the first data element in a first portion of the GUI.

In 306, report generator 102 receives a second set of data comprising a second set of data elements. The second set of data elements include text data and image data associated with the incident. The second set of data may be associated with a support team member attempting to resolve the issue associated with the incident. The text data may describe the actions performed to resolve the issue, and the image data may depict the support team member troubleshooting the application.

In 308, report generator 102 incorporates the second set of data on the GUI. Report generator 102 may group the second set of elements in a second portion of the GUI. The first portion and the second portion are rendered chronologically on the GUI based on a first timestamp of when the first set of data was received and a second timestamp of when the second set of data was received.

In 310, report generator 102 receives a request to delete one or more data elements of the set first or second set of data elements from the GUI. A support team member may want to delete one or more data elements (e.g., image or text data) from the GUI because the one or more data elements are duplicative or inaccurate.

In 312, report generator 102 consolidates the first and second portions into a combined portion on the GUI. The combined portion comprises the first set of data and the second set of data, excluding the one or more data elements. For example, the combined portion may not include data elements that were selected to be deleted.

Figure 4:
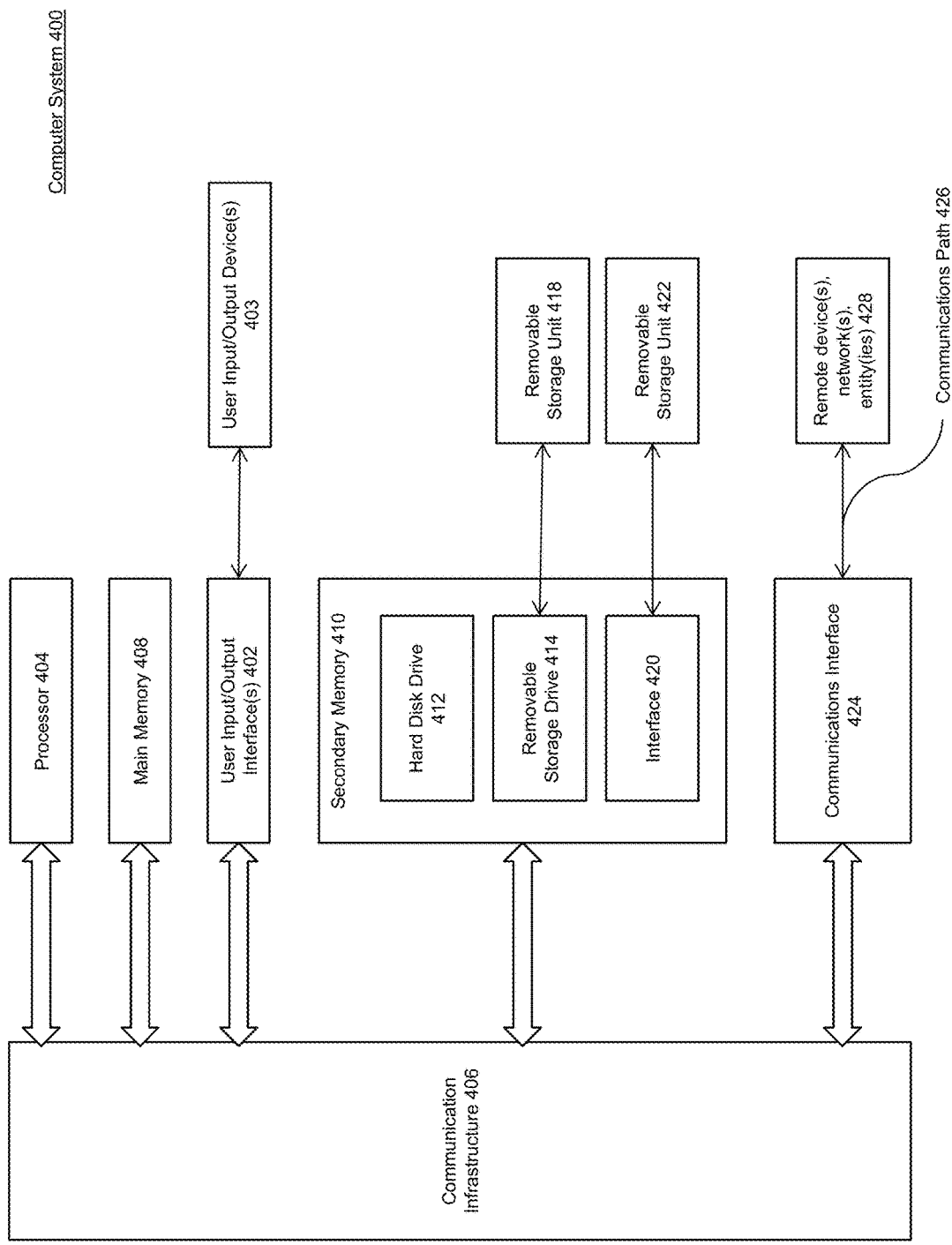
FIG. 4 is an example computer system useful for implementing various embodiments.

Various embodiments can be implemented, for example, using one or more computer systems, such as computer system 400 shown in FIG. 4. Computer system 400 can be used, for example, to implement methods 300 of FIG. 3. Furthermore, computer system 400 can be at least part of server 100, client device 110, data storage device 120, and user device 130, as shown in FIG. 1. For example, computer system 400 route communication to various applications. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities, or other approaches for allowing computer programs and/or other instructions and/or data to be accessed by computer system 400. Such means, instrumentalities, or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving, by a processor, a set of data comprising a first set of data elements related to a user incident report, the first set of data elements include a first screenshot of a user incident corresponding to the user incident report as submitted by an end user of an application;
   receiving a second set of data indicating one or more steps that were taken to resolve the user incident by a first support user, wherein the second set of data includes a second screenshot related to the one or more steps that were taken to resolve the user incident, wherein the user incident was not resolved by the first support user;
   incorporating, by the processor, the first set of data elements and the second set of data on a graphical user interface (GUI), wherein the first set of data elements is rendered in a first portion of the GUI and the second set of data is rendered in a second portion of the GUI, and wherein the first portion and the second portion are displayed simultaneously and rendered chronologically on the GUI based on a first timestamp of when the first set of data elements was received and a second timestamp of when the second set of data was received;
   receiving a third set of data indicating one or more additional steps that were taken to resolve the user incident by a second support user;
   displaying the third set of data simultaneously and chronologically on a third portion of the GUI with the first portion and the second portion, wherein the third portion is rendered above the second portion and the first portion on the GUI, wherein the GUI indicates which data and screenshots were provided by which of the end user, the first support user, or the second support user;
   receiving, by the processor, a request to delete one or more data elements of the first set of data elements or the second set of data from the GUI;
   consolidating, by the processor, the first portion and the second portion into a combined portion on the GUI, the combined portion comprising the first set of data elements and the second set of data, excluding the deleted one or more data elements, wherein the combined portion includes both the first screenshot of the user incident corresponding to the user incident report and the second screenshot related to the one or more steps that were taken to resolve the user incident;
   receiving, from a third user, a request to merge the first screenshot and the second screenshot displayed on the GUI; and
   responsive to the request to merge, automatically positioning the first screenshot and the second screenshot horizontally adjacent to one another on the GUI, and corresponding extracted text vertically adjacent to one another.

2. The method of claim 1, wherein the first set of data elements and the second set of data comprise image data and text data.

3. The method of claim 2, further comprising:
   extracting, by the processor, text from the image data; and
   rendering, by the processor, the text extracted from the image data on the GUI.

4. The method of claim 1, wherein the set of data, the second set of data, and the third set of data are associated with the user incident report and are directed to resolving the user incident.

5. The method of claim 1, further comprising receiving, by the processor, a new request to merge a first data element in the first set of data elements and a second data element in the second set of data on the GUI.

6. The method of claim 5, further comprising positioning, by the processor, the first data element and the second data element in the combined portion in a predetermined arrangement on the GUI in response to the new request.

7. The method of claim 1, further comprising:
   saving, by the processor, the combined portion as a file in a data storage device.

8. The method of claim 1, wherein the consolidating comprises:
   receiving, from a user, a request to generate a summary of the user incident report; and
   rearranging a visual arrangement of the first screenshot and the second screenshot on a new summary page responsive to receive the request to generate the summary.

9. The method of claim 1, wherein the corresponding extracted text comprises text extracted from the first screenshot and the second screenshot.

10. A system comprising:
    a memory; and
    a processor coupled to the memory, wherein the processor is configured to:
      receive a set of data comprising a first set of data elements related to a user incident report, the first set of data elements include a first screenshot of a user incident corresponding to the user incident report as submitted by an end user of an application;

receive a second set of data indicating one or more steps that were taken to resolve the user incident by a first support user, wherein the second set of data includes a second screenshot related to the one or more steps that were taken to resolve the user incident, wherein the user incident was not resolved by the first support user;

incorporate the first set of data elements and the second set of data on a graphical user interface (GUI), wherein the first set of data elements is rendered in a first portion of the GUI and the second set of data is rendered in a second portion of the GUI, and wherein the first portion and the second portion are displayed simultaneously and rendered chronologically on the GUI based on a first timestamp of when the first set of data elements was received and a second timestamp of when the second set of data was received;

receive a third set of data indicating one or more additional steps that were taken to resolve the user incident by a second support user;

display the third set of data simultaneously and chronologically on a third portion of the GUI with the first portion and the second portion, wherein the third portion is rendered above the second portion and the first portion on the GUI, wherein the GUI indicates which data and screen shots were provided by which of the end user, the first support user or the second support user;

receive a request to delete one or more data elements of the first set of data elements or the second set of data from the GUI;

consolidate the first portion and the second portion into a combined portion on the GUI, the combined portion comprising the first set of data elements and the second set of data, excluding the deleted one or more data elements, wherein the combined portion includes both the first screen shot of the user incident corresponding to the user incident report and the second screenshot related to the one or more steps were taken to resolve the user incident;

receiving, from a third user, a request to merge the first screenshot and the second screenshot displayed on the GUI; and responsive to the request to merge, automatically position the first screenshot and the second screenshot horizontally adjacent to one another on the GUI, and corresponding extracted text vertically adjacent to one another.

11. The system of claim 10, wherein the first set of data elements and the second set of data comprise image data and text data.

12. The system of claim 11, wherein the processor is further configured to:
extract text from the image data; and
render the text extracted from the image data on the GUI.

13. The system of claim 10, wherein the set of data, the second set of data, and the third set of data are associated with the user incident report and are directed to resolving the user incident.

14. The system of claim 10, wherein the processor is further configured to receive a new request to merge a first data element in the first set of data elements and a second data element in the second set of data on the GUI.

15. The system of claim 14, wherein the processor is further configured to position the first data element and the second data element in the combined portion in a predetermined arrangement on the GUI in response to the new request.

16. The system of claim 10, wherein the processor is further configured to save the combined portion as a file in a data storage device.

17. A non-transitory computer-readable medium having instructions stored thereon that, when executed by at least one computing device, cause the at least one computing device to perform operations comprising:

receiving a set of data comprising a first set of data elements related to a user incident report, the first set of data elements include a first screen shot of a user incident corresponding to the user incident report as submitted by an end user of an application;

receiving a second set of data indicating one or more steps that were taken to resolve the user incident by a first support user, wherein the second set of data includes a second screenshot related to the one or more steps that were taken to resolve the user incident, wherein the user incident was not resolved by the first support user;

incorporating the first set of data elements and the second set of data on a graphical user interface (GUI), wherein the first set of data elements is rendered in a first portion of the GUI and the second set of data is rendered in a second portion of the GUI, and wherein the first portion and the second portion are displayed simultaneously and rendered chronologically on the GUI based on a first timestamp of when the first set of data elements was received and a second timestamp of when the second set of data was received;

receiving a third set of data indicating one or more additional steps that were taken to resolve the user incident by a second support user;

displaying the third set of data simultaneously and chronologically on a third portion of the GUI with the first portion and the second portion, wherein the third portion is rendered above the second portion and the first portion on the GUI, wherein the GUI indicates which data and screenshots were provided by which of the end user, the first support user, or the second support user;

receiving a request to delete one or more data elements of the first set of data elements or the second set of data from the GUI;

consolidating the first portion and the second portion into a combined portion on the GUI, the combined portion comprising the first set of data elements and the second set of data, excluding the deleted one or more data elements, wherein the combined portion includes both the first screenshot of the user incident corresponding to the user incident report and the second screenshot related to the one or more steps were taken to resolve the user incident;

receiving, from a third user, a request to merge the first screenshot and the second screenshot displayed on the GUI; and responsive to the request to merge, automatically positioning the first screenshot and the second screenshot horizontally adjacent to one another on the GUI, and corresponding extracted text vertically adjacent to one another.

18. The non-transitory computer-readable medium of claim 17, wherein the first set of data elements and the second set of data comprise image data and text data.

19. The non-transitory computer-readable medium of claim 15, wherein the operations further comprise receiving a new request to merge a first data element in the first set of data elements and a second data element in the second set of data on the GUI.

20. The non-transitory computer-readable medium of claim 19, wherein the operations further comprise positioning the first data element and the second data element in the combined portion in a predetermined arrangement on the GUI in response to the new request.

\* \* \* \* \*